US009089834B2

(12) United States Patent
Nalepa et al.

(10) Patent No.: US 9,089,834 B2
(45) Date of Patent: Jul. 28, 2015

(54) BROMINATED SORBENTS FOR REMOVING MERCURY FROM EMISSIONS PRODUCED DURING FUEL COMBUSTION

(75) Inventors: Christopher J. Nalepa, Zachary, LA (US); Gregory H. Lambeth, Baton Rouge, LA (US); Qunhui Zhou, Baton Rouge, LA (US); Jonathan P. O'Dwyer, Baton Rouge, LA (US)

(73) Assignee: ALBEMARLE CORPORATION, Baton Rouge, LA (US)

( * ) Notice: Subject to any disclaimer, the term of this patent is extended or adjusted under 35 U.S.C. 154(b) by 184 days.

(21) Appl. No.: 13/819,464

(22) PCT Filed: Aug. 19, 2011

(86) PCT No.: PCT/US2011/048450
§ 371 (c)(1),
(2), (4) Date: Feb. 27, 2013

(87) PCT Pub. No.: WO2012/030559
PCT Pub. Date: Mar. 8, 2012

(65) Prior Publication Data
US 2013/0165319 A1    Jun. 27, 2013

Related U.S. Application Data

(60) Provisional application No. 61/378,221, filed on Aug. 30, 2010.

(51) Int. Cl.
| | | |
|---|---|---|
| C01B 31/08 | (2006.01) |
| B01J 20/20 | (2006.01) |
| B01D 53/02 | (2006.01) |
| B01D 53/64 | (2006.01) |

(52) U.S. Cl.
CPC ............... *B01J 20/20* (2013.01); *B01D 53/02* (2013.01); *B01D 53/64* (2013.01); *C01B 31/083* (2013.01); *B01D 2253/102* (2013.01); *B01D 2253/304* (2013.01); *B01D 2253/306* (2013.01); *B01D 2253/308* (2013.01); *B01D 2253/311* (2013.01); *B01D 2257/602* (2013.01); *B01D 2258/0283* (2013.01)

(58) Field of Classification Search
CPC .............................. C01B 31/083; B01J 20/20
USPC .......................................................... 502/417
See application file for complete search history.

(56) References Cited

U.S. PATENT DOCUMENTS

| | | |
|---|---|---|
| 1,788,466 A | 1/1931 | Lourens |
| 3,439,025 A | 4/1969 | Gallay et al. |
| 3,876,393 A | 4/1975 | Kasai et al. |
| 5,064,805 A | 11/1991 | Otowa |
| 5,883,040 A | 3/1999 | Armstrong et al. |
| 5,891,324 A | 4/1999 | Ohtsuka |
| 6,514,907 B2 | 2/2003 | Tsutsumi et al. |
| 6,953,494 B2 | 10/2005 | Nelson, Jr. |
| 2001/0002387 A1 | 5/2001 | Tsutsumi et al. |

FOREIGN PATENT DOCUMENTS

| | | |
|---|---|---|
| DE | 102005038827 | 2/2005 |
| EP | 0001456 | 8/1978 |
| EP | 0794240 | 9/1997 |
| EP | 1090881 | 4/2001 |
| GB | 1553364 | 9/1979 |
| WO | 2010036750 | 4/2010 |
| WO | 2010114985 | 10/2010 |

OTHER PUBLICATIONS

Lee, et al; "Removal of Gas-Phase Elemental Mercury by Iodine- and Chlorine-Impregnated Activated Carbons"; Atmospheric Environment, 2004, pp. 4887-4893, vol. 38, Elsevier Ltd; South Korea.

*Primary Examiner* — Stuart Hendrickson
(74) *Attorney, Agent, or Firm* — Marcy M. Hoefling; James A. Jubinsky; Nathan C. Dunn

(57) ABSTRACT

Activated cellulosic-based carbon is rendered more thermally stable by exposure to water or aqueous acid, and optionally, to a halogen and/or a halogen-containing compound. Such treated cellulosic-based carbon has enhanced thermal properties and is suitable for use in mitigating the content of hazardous substances in flue gases, especially flue gases having a temperature within the range of from about 100° C. to about 420° C.

2 Claims, No Drawings

US 9,089,834 B2

BROMINATED SORBENTS FOR REMOVING MERCURY FROM EMISSIONS PRODUCED DURING FUEL COMBUSTION

BACKGROUND

It has become both desirable and necessary to reduce the hazardous substance content of industrial flue gasses. The hazardous substances can have a deleterious affect on the public health and the environment. Industry and government have been working to reduce the emissions of such substances with good progress being made. Special focus has been on flue gas from coal-fired boilers, such as that found in electric generation plants. Recent focus has also been on emissions from cement kilns. But there is more to do. Hazardous substances include, particulates, e.g. fly ash, acid gases, e.g. SOx, NOx, dioxins, furans, heavy metals and the like.

The methods used to mitigate the emission of hazardous substances depend on the nature of the hazardous substance, the minimum emission level sought, the volume of emitted gas to be treated per unit time and the cost of the mitigating method. Some hazardous substances lend themselves to removal from gaseous effluent by mechanical means, e.g. capture and removal with electrostatic precipitators (ESP), fabric filters (FF) or wet scrubbers. Other substances do not lend themselves to direct mechanical removal.

Hazardous gaseous substances that are present in a gaseous effluent present interesting challenges, given that direct mechanical removal of any specific gaseous component from a gas stream is problematic. However, it is known, and an industrial practice, to remove hazardous gaseous components from a gaseous effluent by dispersing a fine particulate adsorbent evenly in the effluent to contact and capture, in flight, the targeted gaseous component. This is followed by mechanical removal of the adsorbent with its adsorbate from the effluent vapor by ESP, FF or wet scrubbers. A highly efficacious adsorbent is carbon, e.g., cellulosic-based carbons, powdered activated carbon (PAC), etc. Such PACs, for example, can be used with or without modification. Modified PACs may enhance capture of the target hazardous substance by enhancing adsorption efficiency. PAC modification is exemplified by U.S. Pat. No. 4,427,630; U.S. Pat. No. 5,179,058; U.S. Pat. No. 6,514,907; U.S. Pat. No. 6,953,494; US 2001/0002387; US 2006/0051270; and US 2007/0234902. Cellulosic-based carbons include, without limitation, carbons derived from woody materials, coconut shell materials, or other vegetative materials.

A problem with the use of cellulosic-based carbons in industrial applications, is their unreliable thermal stability, that is, the lack of assurance that they are resistant to self-ignition. Self-ignition is especially problematic when the cellulosic-based carbon is used in the treatment of warm or hot gaseous effluents or when packaged or collected in bulk amounts. For example, bulk PAC is encountered (i) when the PAC is packaged, such as in super-sacks or (ii) when formed as a filter cake in an FF unit or is collected in silos or hoppers associated with an ESP, TOXECON unit, and baghouse. Self-ignition results from unmitigated oxidation of the carbon and can lead to its smoldering or burning. Self-ignition is exacerbated by the carbon being warm or hot, as could be the case when used in treating coal-fired boiler effluents. If oxygen (air) is not denied to the oxidation site or if the site is not cooled, the heat from the initial oxidation will propagate until the carbon smolders or ignites. Such an ignition can be catastrophic. Utility plants are especially sensitive about self-ignition as smoldering or fire within the effluent line can cause plant shut-down with widespread consequences to served customers.

Further information on PAC thermal stability can be found in U.S. Pat. No. 6,843,831, "Process for the Purification of Flue Gas." Some carbons are more resistant to self-ignition than others. For example, in the US, the use of coal-derived PACs is the industry standard for utility flue gas treatment, in part because of the good thermal stability of coal-derived PACs.

It would be advantageous if PACs of lesser thermal stability, such as, those derived from certain cellulosic-based carbons could be modified to be more thermally stable so that the practitioner could enjoy the benefit of the excellent adsorption qualities of cellulosic-based carbons.

THE INVENTION

This invention meets the above-described needs by providing a thermally-activated cellulosic-based carbon that has been extracted with a composition comprising water or an aqueous acid and that has at least one of the following: (i) a temperature of initial energy release that is greater than the temperature of initial energy release for the same thermally-activated cellulosic-based carbon without the extraction; (ii) a self-sustaining ignition temperature greater than the self-sustaining ignition temperature for the same thermally-activated cellulosic-based carbon without the extraction; or (iii) an early stage energy release value that is less than the early stage energy release value for the same thermally-activated cellulosic-based carbon without the extraction. Also provided is such a thermally-activated cellulosic-based carbon that subsequent to being extracted was halogenated with a halogen and/or halogen-containing compound comprising bromine, chlorine, fluorine, iodine, ammonium bromide, other nitrogen-containing halogen salts, or calcium bromide and, optionally, contains from about 5 to about 20 wt % halogen, the wt % being based on the total weight of the thermally-activated cellulosic-based carbon prior to halogenated with the halogen and/or the halogen-containing compound. Also provided by this invention are processes for enhancing the thermal stability of a thermally-activated cellulosic-based carbon, which process comprises extracting the thermally-activated cellulosic-based carbon with a composition comprising water or an aqueous acid such that the extracted thermally-activated cellulosic-based carbon has at least one of the following: (i) a temperature of initial energy release greater than the temperature of initial energy release for the same thermally-activated cellulosic-based carbon prior to the extraction; (ii) a self-sustaining ignition temperature greater than the self-sustaining ignition temperature for the same thermally-activated cellulosic-based carbon prior to the extraction; or (iii) an early stage energy release value that is less than the early stage energy release value for the same thermally-activated cellulosic-based carbon prior to the extraction. Also provided are such processes wherein the extracted thermally-activated cellulosic-based carbon is halogenated with a halogen and/or halogen-containing compound comprising bromine, chlorine, fluorine, iodine, ammonium bromide, other nitrogen-containing halogen salts, or calcium bromide; and such processes wherein the extracted thermally-activated cellulosic-based carbon is exposed to the halogen and/or the halogen-containing compound at a temperature from about 82 to about 105° C. and for a period of time within the range of from about 0.1 to about 3 seconds.

The production of activated cellulosic-based carbons, e.g., wood-based PACs, is well known and generally entails either a thermal activation or chemical activation process. For more details see, *Kirk-Othmer Encyclopedia of Chemical Technology*, 4th Edition, Volume 4, pages 1015-1037 (1992). The activated wood-based carbon can be produced from any woody material, such as sawdust, woodchips, coconut shell materials, or other vegetative materials.

Aqueous acids suitable for use in this invention include aqueous HCL, aqueous sulfuric acid, aqueous nitric acid, aqueous hydrobromic acid, and the like.

Activated cellulosic-based carbons are commercially available. For example, activated wood-based carbons can be obtained from MeadWestvaco Corporation, Specialty Chemical Division. Activated coal-based carbons are also commercially available. Activated lignite-based carbons can be obtained from Norit Americas, Inc., whilst activated bituminous-based carbons can be obtained from Calgon Corporation. Activated carbons can be characterized by their particle size distribution ($D^{10}$, $D^{50}$ and $D^{90}$); average particle size; BET surface area; Iodine No.; total pore volume; pore volume distribution (macro/meso and micro pores); elemental analysis; moisture content; and ash speciation and content. Particularly useful activated carbons have one or more of the following characteristics:

| Characteristic | General Range | Specific Range |
| --- | --- | --- |
| $D^{10}$ | 1-10 μm | 2-5 μm |
| $D^{50}$ | 5-35 μm | 10-20 μm |
| $D^{90}$ | 20-100 μm | 30-60 μm |
| Average Particle Size: | 10-50 μm | 5-25 μm |
| BET: | >300 m²/g | >500 m²/g |
| Iodine No.: | 300-1200 mg/g | >600 mg/g |
| Total Pore Volume: | 0.10-1.20 cc/g | 0.15-0.8 cc/g |
| Macro/Meso Pore Volume: | 0.05-0.70 cc/g | 0.05-0.40 cc/g |
| Micro Pore Volume: | 0.05-0.50 cc/g | 0.10-0.40 cc/g |
| Ash Content: | 0-15 wt % | <10 wt % |
| Moisture Content: | 0-15 wt % | <5 wt % |

Several techniques exist for determining the thermal properties of materials. For example, one can determine (i) the temperature of initial energy release; (ii) the self-sustaining ignition temperature; and/or (iii) the early stage energy release values. For these determinations it is useful to have a Differential Scanning calorimetry (DSC) trace of the heat flow values vs temperature (° C.) of the treated and untreated activated cellulosic-based carbon samples as they are controllably heated. The DSC conditions can be as follows: the sample size is about 10 mg; the carrier gas is air at a flow rate of 100 ml/minute; the temperature ramp rate is 10 degrees centigrade/minute from ambient temperature to 850° C. The DSC can be run on a TA Instruments Thermal Analyst 5000 Controller with Model 2960 DSC/TGA module. The DSC traces created from the DSC test results can be analyzed with TA Instruments Universal Analysis Software, version 4.3.0.6. The sample can be dried thoroughly before being submitted to DSC testing. Thermal drying is acceptable, e.g., drying a 0.5 to 5.0 gram sample at a temperature of 110° C. for 1 hour. The values obtained from the DSC testing can be traced on a Heat Flow (watts/gram) versus Temperature (° C.) graph.

The thermal stability of a substance can be assessed, e.g., via the temperature of initial energy release, a.k.a., the point of initial oxidation (PIO) of the substance. As used in this specification, including the claims, the PIO of compositions and/or sorbents of this invention is defined as the temperature at which the heat flow, as determined by DSC, has increased by 1.0 W/g with the baseline corrected to zero at 100° C. PIO has been found to be a good predictor of thermal stability, especially when compared to values for PACs known to generally have suitable thermal stability, i.e. "benchmark carbons." One such a benchmark carbon is exemplified by the lignite coal derived PAC impregnated with NaBr marketed by Norit Americas, Inc., designated DARCO Hg-LH, which coated PAC has been found to have a PIO value of 343° C.

Another thermal stability assessment method of comparison is the self-sustaining ignition temperature (SIT). The SIT is usually defined as the intersection of the baseline and the slope at the inflection point of the heat flow as a function of temperature curve. The inflection point can be determined using TA Instruments Universal Analysis Software. Generally, the inflection point is defined in differential calculus as a point on a curve at which the curvature changes sign. The curve changes from being concave upwards (positive curvature) to concave downwards (negative curvature), or vice versa.

One final thermal stability assessment method involves determining the early stage energy release values by integration of the DSC trace between 125° C. to 425° C. and between 125° C. to 375° C. The values from these two integrations are each compared against the same values obtained for PACs that are known to generally have suitable thermal stability, i.e. "benchmark carbons." Such a benchmark carbon is again exemplified by the lignite coal derived PAC designated as DARCO Hg-LH, which has been found to have an early stage energy release values (125° C. to 425° C.) of 1,378 joules/gram and 370 joules/gram for 125° C. to 375° C.

EXAMPLES

The following examples are illustrative of the principles of this invention. It is understood that this invention is not limited to any one specific embodiment exemplified herein, whether in the examples or the remainder of this patent application.

Example 1

Comparative Example

Properties of Starting Wood-Based PAC

A wood-based PAC (prepared by the thermal activation process) was analyzed by DSC-TGA. The point of initial energy release (PIO) was 257 C. PIO is defined as the temperature at which the heat flow, as determined by DSC, is 1 W/g with the baseline corrected to zero at 100 C.

Example 2

Comparative Example

Bromination of Wood-Based PAC

The wood-based PAC of example 1 was brominated [at 80 C] according to the process disclosed in U.S. Pat. No. 6,953,494. Elemental analysis indicated that the PAC had a bromine content of 5 wt %. Analysis by DSC-TGA indicated that the PIO was 364 C.

Example 3

Extraction of Wood-Based PAC with Water

A 500-mL round-bottom triple-neck flask fitted with a reflux condenser, glass thermowell for a thermocouple, and magnetic stirrer was charged with a wood-based activated carbon (25.1 g, from MeadWestvaco) and purified water. The reaction contents were stirred and brought to reflux for one hour. The reaction contents were cooled, collected on a Buchner funnel and dried overnight at 60 C to furnish a water-washed PAC. Analysis by DSC-TGA indicated that the PIO was 279 C.

Example 4

Extraction of Wood-Based PAC with Dilute Acid

The procedure of Example 3 was followed except that a dilute solution of HCl (concentrated HCl diluted 1:10 with purified water) was employed in this case. This yielded an acid-washed PAC. Analysis by DSC-TGA indicated that the PIO was 435 C.

Example 5

Bromination of Water-Washed PAC

The water-washed PAC of Example 3 was brominated [at 80 C] according to the process disclosed in U.S. Pat. No. 6,953,494. Elemental analysis indicated that the PAC had a bromine content of 5 wt %. Analysis by DSC-TGA indicated that the temperature of initial energy release was 344 C.

Example 6

Bromination of Acid-Washed PAC

The acid-washed PAC of Example 4 was brominated [at 80 C] according to the process disclosed in U.S. Pat. No. 6,953,494. Elemental analysis indicated that the PAC had a bromine content of 5 wt %. Analysis by DSC-TGA indicated that the temperature of initial energy release was 415 C. A comparison with example 2 indicates that a significant improvement in the thermal properties of the base brominated PAC was obtained (49 C).

Example 7

Comparative Example

Bromination of Coal-Based (Bituminous) PAC

A coal-based PAC (bituminous, from Calgon Carbon) was brominated [at 80 C] according to the process disclosed in U.S. Pat. No. 6,953,494. Elemental analysis indicated that the PAC had a bromine content of 5 wt %. Analysis by DSC-TGA indicated that the PIO was about 370 C.

Example 8

Mercury Capture for the Brominated Base, Water-Washed, and Acid-Washed PACs The following data indicate that the water- and acid-washing processes improved the thermal properties of brominated activated carbons and provided good mercury capture results as well. These data were obtained using the mercury capture device described more fully in U.S. Pat. No. 6,953,494.

| Brominated PAC | Mercury Capture, (%, Avg) |
|---|---|
| Example 2 (Comparative) | 72 |
| Example 5 | 76 |
| Example 6 | 75 |

This invention is particularly advantageous in that it provides cellulose-based PAC's with thermal properties comparable or superior to those of coal-based PACs. The PACs of this invention also demonstrate superior mercury capture ability.

It is to be understood that the reactants and components referred to by chemical name or formula anywhere in the specification or claims hereof, whether referred to in the singular or plural, are identified as they exist prior to being combined with or coming into contact with another substance referred to by chemical name or chemical type (e.g., another reactant, a solvent, or etc.). It matters not what chemical changes, transformations and/or reactions, if any, take place in the resulting combination or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical reaction or in forming a combination to be used in conducting a desired reaction. Accordingly, even though the claims hereinafter may refer to substances, components and/or ingredients in the present tense ("comprises", "is", etc.), the reference is to the substance, component or ingredient as it existed at the time just before it was first contacted, combined, blended or mixed with one or more other substances, components and/or ingredients in accordance with the present disclosure. Whatever transformations, if any, which occur in situ as a reaction is conducted is what the claim is intended to cover. Thus the fact that a substance, component or ingredient may have lost its original identity through a chemical reaction or transformation during the course of contacting, combining, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof. As will be familiar to those skilled in the art, the terms "combined", "combining", and the like as used herein mean that the components that are "combined" or that one is "combining" are put into a container, e.g., a combustion chamber, a pipe, etc. with each other. Likewise a "combination" of components means the components having been put together in such a container.

While the present invention has been described in terms of one or more preferred embodiments, it is to be understood that other modifications may be made without departing from the scope of the invention, which is set forth in the claims below.

What is claimed is:

1. A process for enhancing the thermal stability of a thermally-activated cellulosic-based carbon, which process comprises extracting the thermally-activated cellulosic-based carbon with a composition comprising water or an aqueous acid, and halogenating the extracted thermally-activated cellulosic-based carbon with halogen and/or halogen-containing compound at a temperature from about 82 to about 105° C. for a period of time within the range of from about 0.1 to about 3 seconds, such that the extracted thermally-activated cellulosic-based carbon has at least one of the following: (i) a temperature of initial energy release greater than the temperature of initial energy release for the same thermally-activated cellulosic-based carbon prior to the extraction; (ii) a self-sustaining ignition temperature greater than the self-sustaining ignition temperature for the same thermally-activated cellulosic-based carbon prior to the extraction; or (iii) an early stage energy release value that is less than the early stage energy release value for the same thermally-activated cellulosic-based carbon prior to the extraction.

2. The process of claim 1 wherein the halogen and/or halogen containing compound comprises bromine, chlorine, fluorine, iodine, ammonium bromide, other nitrogen-containing halogen salts, or calcium bromide.

* * * * *